United States Patent [19]

Motsinger et al.

[11] 4,396,911
[45] Aug. 2, 1983

[54] MULTI-POINT LEVEL INDICATOR SYSTEM

[75] Inventors: James V. Motsinger; Tom L. Erb, both of Austin, Tex.

[73] Assignee: Ramsey Engineering Company, St. Paul, Minn.

[21] Appl. No.: 248,075

[22] Filed: Mar. 27, 1981

[51] Int. Cl.³ ............................................ G08B 21/00
[52] U.S. Cl. .................................. 340/617; 340/619; 250/577; 73/293
[58] Field of Search ............... 340/517, 518, 505, 612, 340/617–619, 825.1, 825.11, 825.54; 73/293; 364/509, 564, 579; 250/428, 564, 573, 574, 577

[56] References Cited

U.S. PATENT DOCUMENTS

| 2,802,520 | 4/1959 | Hass | 340/619 |
| 3,322,959 | 5/1967 | Lorenz | 340/617 |
| 3,908,133 | 9/1975 | Hartley | 340/617 |
| 3,908,441 | 9/1975 | Virgolet | 250/577 |
| 4,058,765 | 11/1977 | Richardson et al. | 340/617 |
| 4,103,292 | 7/1978 | Hass | 340/617 |
| 4,160,239 | 7/1979 | Adamson | 340/518 |

FOREIGN PATENT DOCUMENTS

| 667815 | 6/1979 | U.S.S.R. | 73/293 |
| 669197 | 6/1979 | U.S.S.R. | 250/577 |

Primary Examiner—Gerald L. Brigance
Attorney, Agent, or Firm—William C. Norvell, Jr.

[57] ABSTRACT

An apparatus for monitoring the level of material in a plurality of hoppers or bins includes a radiation source and sensor associated with each hopper. Each sensor generates an output signal representing the incidence of radiation passing through the material in the respective hopper. The sensor output signals are supplied to individual sample/hold circuits where they are temporarily stored. A central control circuit cyclically reads the stored signals from the sample/hold circuits and then generates a reset signal to clear the sample/hold circuits. The central control circuit compares the sum of the sensor output signals for each sensor over a predetermined time interval with at least one reference signal representing a predetermined material amount to generate a status signal for each hopper. A plurality of indicator circuits are responsive to respective condition of the status signals for visually and/or audibly indicating to an operator the status of the material level in the associated hopper.

14 Claims, 5 Drawing Figures

MULTI-POINT LEVEL INDICATOR SYSTEM

CROSS-REFERENCE TO RELATED APPLICATIONS

This application is related in subject matter to the following co-pending applications, all of which were filed on the same date as this application, and assigned to the same assignee: "Sample/Hold Circuit For Multi-Point Level Indicator System", Ser. No. 248,073; "Self-Test Circuit For Multi-Point Level Indicator System", Ser. No. 248,074; and "Wall Build-Up Detector For A Multi-Point Level Indicator System", Ser. No. 248,072.

BACKGROUND OF THE INVENTION

1. Field of the Invention

The present invention relates to a level indicating apparatus and in particular to an apparatus for monitoring the level of the contents of a plurality of hoppers.

2. Description of the Prior Art

In many industries, it is desirous to monitor the level of the contents of various bins or hoppers. For example, if a hopper is used for filling other containers, an operator must know when the hopper is full so that he can empty the hopper to prevent any overflow. Similarly, an operator must know when the hopper is emptied so that he can have it refilled.

Previously, the level of the fill material in a hopper was monitored by using a single point level gauge. However, a single point gauge can only monitor the level of a single hopper. Consequently, in a factory which contains a plurality of hoppers whose levels must be monitored, a separate single point level gauge must be used for each hopper. Some prior systems have incorporated a plurality of such single point gauges into one apparatus, such that the system has the capability of monitoring more than one hopper. However, these systems merely duplicate the complete gauge for each hopper.

Prior art level indicator systems have typically utilized a radiation beam for monitoring the level of the contents in a hopper. For example, a radiation source is positioned to direct a radiation beam through a hopper at a point where the level of the contents is to be detected. A radiation sensor is positioned on the opposite side of the hopper to monitor the amount of radiation which passes through the hopper. When the beam must pass through the hopper contents, the amount of radiation received by the sensor is relatively low, since much of the radiation will be absorbed. On the other hand, if the beam passes through the hopper without passing through the contents, the amount of radiation received by the sensor is relatively high. However, one problem associated with these types of radiation sensors is that they are typically prone to a relatively high failure rate. Thus, an operator must constantly check the sensor to ensure that it is operating properly.

Another problem associated with both radiation sensors and other types of sensors occurs when there is a build up of fill material on the side walls of the hopper. In these instances, a level gauge monitoring a hopper which has just been emptied may indicate that the hopper is full, since the gauge will detect the fill material on the side walls of the hopper. Thus, an operator must periodically inspect the hoppers to make sure that the side walls of the hopper are relatively free of fill material.

SUMMARY OF THE INVENTION

The present invention relates to a system for monitoring the level of a fill material in a plurality of hoppers. The system typically utilizes a plurality of radiation-type sensors each of which generates an output signal pulse upon the incidence of radiation travelling through the respective hopper. Each sensor output signal is supplied to a sample/hold circuit which includes a storage means for temporarily storing the occurance of a sensor output signal. A central control circuit is connected to the sample/hold circuits and monitors the number of output pulses generated over a predetermined time interval for each hopper. The central control circuit selectively checks the sample/hold circuits for the occurance of a sensor output pulse and then generates a reset signal to clear the storage means. The central control circuit compares the total number of pulses received from each sensor during the interval with predetermined signals representing amounts of material for determining whether a particular hopper is "full" or "not full". The central control circuit will then generate a plurality of status signals to a plurality of indicator circuits each of which includes indicator lights to visually indicate to the operator the status of the content level of each hopper.

DESCRIPTION OF THE PREFERRED EMBODIMENTS

Figure 1:
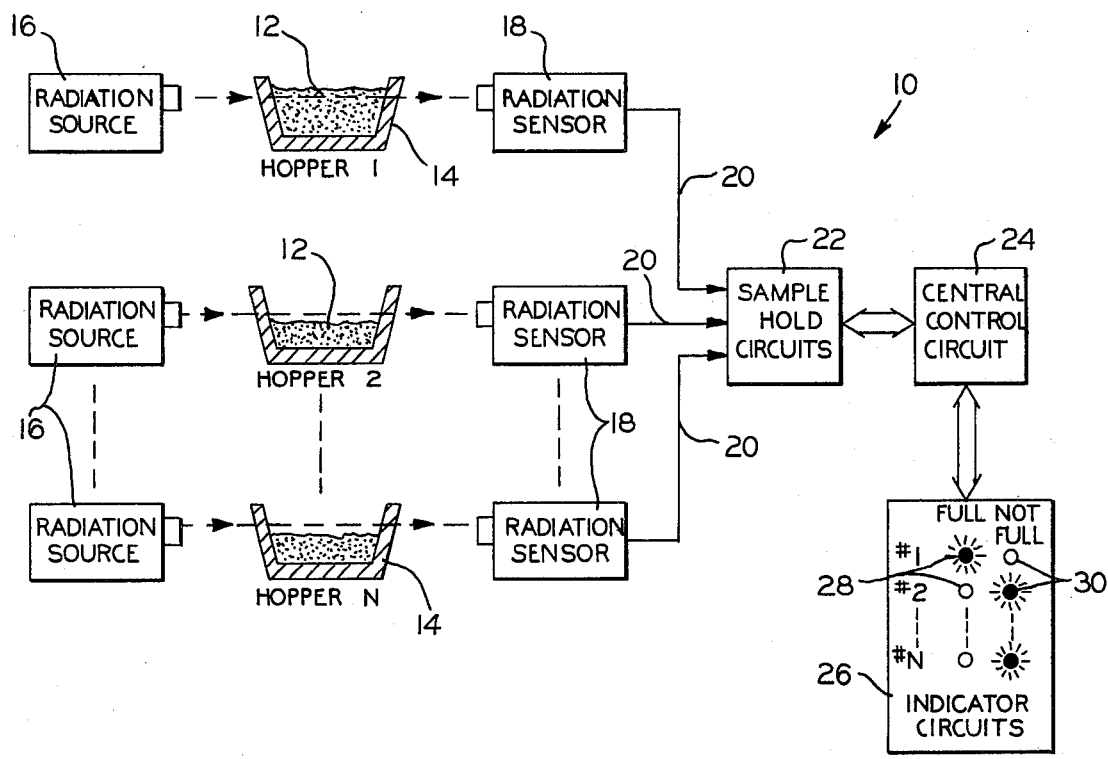
FIG. 1 is a block diagram of a multi-point level indicator.

There is shown in FIG. 1 a multi-point indicator system 10 according to the present invention. The system is utilized to monitor the level of a fill material 12 in a plurality of individual hoppers or bins 14. The fill material can be, for example, a grannular material such as coal or grain, or the material can be of liquid form.

A plurality of radiation sources 16 individual to each hopper direct a beam of radiation through each hopper at a level where the fill material is to be detected. A plurality of radiation sensors 18 are positioned on the opposite side of each hopper and sense the amount of radiation which passes through the hopper. The amount of radiation received by a particular sensor is related to the amount of the fill material in the associated hopper at a predetermined level. For example, if the radiation beam passes through the hopper without passing through any fill material, as is shown in FIG. 1 for HOPPER #2, a relatively high amount of radiation will be received by the associated sensor 18. On the other hand, if the radiation beam passes through the fill material, as is shown in FIG. 1 for HOPPER #1, the fill material will absorb a portion of the radiation such that a smaller amount of radiation is received by the respective sensor.

The radiation sensor 18 can be a commercially available GM tube. This type of sensor generates an output pulse when a radiation incident occurs. Thus, the number of output pulses increases as the amount of radiation received increases.

The output signals from the sensors 18 are generated on a plurality of lines 20 and are supplied to sample/hold circuits 22. The circuits 22 include a separate sample/hold circuit for each radiation sensor 18, plus interface circuitry required to connect the circuits 22 to a single central control circuit 24. The central control circuit 24 is connected to indicator circuits 26. The circuits 26 include a separate indicator circuit for each hopper being monitored, plus interface circuitry required to connect each indicator circuit to the central control circuit 24.

The sample/hold circuits 22 are utilized to temporarily store the output pulses generated by the group of radiation sensors. The central control circuit 24 is used to monitor the number of pulses generated over a predetermined time period for each hopper. The central control circuit 24 compares the number of pulses received from each sensor with predetermined signal levels for determining whether a particular hopper is "full" or "not full". If the number of pulses generated by a particular sensor 18 corresponds to a radiation level which indicates that the respective hopper is full and should be emptied, the control circuit will generate signals to the indicator circuits 26 to light the respective one of a plurality of "FULL" indicator lights 28. For example, since HOPPER #1 is full, the "FULL" light corresponding to HOPPER #1 is lit (schematically shown in FIG. 1 by an array of radial lines).

The control circuit 24 can also enable an alarm (not shown in FIG. 1) to audbily warn the operator of the full hopper. If the radiation level recorded by the control circuit 24 indicates that the hopper is not full, as is the case for HOPPER #2, the control circuit lights the respective one of a plurality of "NOT FULL" indicator lights 30. As will be discussed, the use of two indicator lights for each hopper provides a means for providing the operator with additional information concerning the status of the fill material in the hopper. Also, the use of two indicator lights ensures the operator that the lights are operating satisfactorily, since under normal operating conditions at least one of the two lights should be on at all times.

It should be noted that, although the system 10 of FIG. 1 is used to distinguish a "full" hopper from a "not full" hopper, the system could also be used to distinguish an "empty" hopper from a "not empty" hopper. In this case, the radiation sources 16 and the radiation sensors 18 are positioned to direct a radiation beam along a line near the bottom of the hoppers. The system could also be used to monitor one portion of the hoppers for a "full" condition, while simultaneously monitoring another portion of the hoppers for an "empty" condition.

Figure 2:
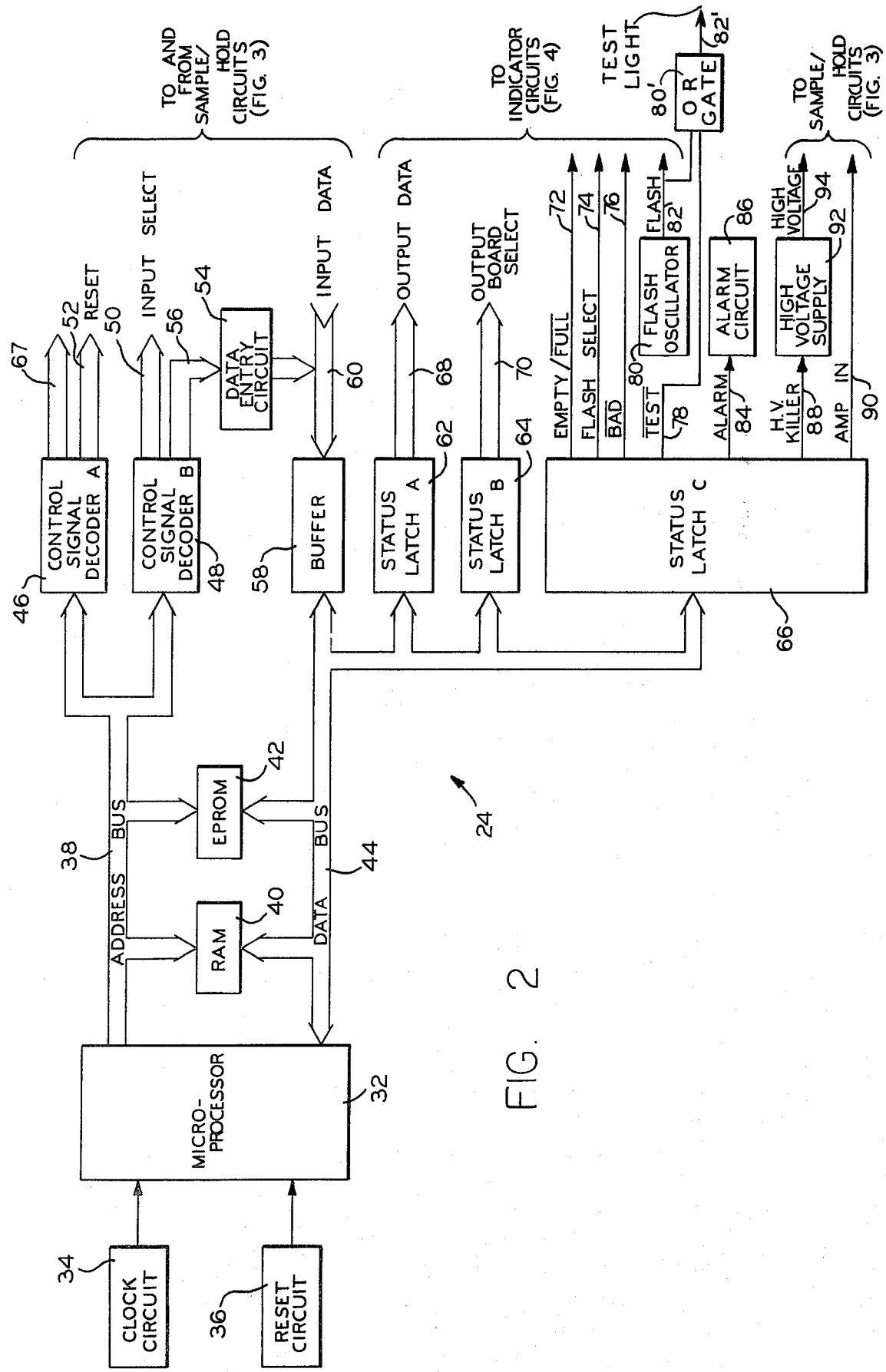
FIG. 2 is a block diagram of the central control circuit of FIG. 1.

There is shown in FIG. 2 a simplified block diagram of the central control circuit 24. A microprocessor 32 controls the other elements of the central control circuit. The microprocessor can be a model Z-80 manufactured by Zilog Incorporated or Mostek Corporation. A clock circuit 34 generates a clock signal at a predetermined frequency to the microprocessor for controlling the various operations of the microprocessor. A reset circuit 36 generates a reset signal to the microprocessor 32 to re-start the microprocessor after a shutdown period or a power failure period.

The microprocessor 32 generates address signals on an address bus 38 which includes a plurality of address lines. The address bus 38 is connected to a random access memory (RAM) 40 and an erasable programmable read only memory (EPROM) 42. The address signals supplied to the RAM 40 and the EPROM 42 are used to address specific memory locations. The data and instructions are transfered between the RAM 40 and EPROM 42 and the microprocessor 32 by a data bus 44 consisting of a plurality of individual data lines. The Ram 40 can include model P2101A-4 RAMs manufactured by Intel Corporation and the EPROM 42 can include one or more model C2716 EPROMs manufactured by Mostek Corporation.

The EPROM 42 is programmed with the instructions required to implement the various operations of the central control circuit. These operations will be discussed in detail following the description of the circuit. The RAM 40 is used for storing the radiation counts for each hopper and for temporary storage of data during data calculations. In addition to transferring data to and from the memories, the signals on address bus 38 and data bus 44 also perform other functions. The address bus 38 has a portion of the address lines connected to two control signal decoders, decoder A 46 and decoder B 48. The decoders 46 and 48 can be model MC14514B four-to-sixteen line decoders manufactured by Motorola Incorporated which are utilized to generate a plurality of control signals to the various circuits being controlled by the microprocessor. For example, decoder B generates an amount of material at an associated plurality of INPUT SELECT signals on lines 50 which are utilized for reading the sample/hold circuits, while the decoder A 46 generates an amount of material at an associated plurality of RESET signals on line 52 which are utilized to clear the sample/hold circuits after they have been read by the central control circuit. The decoder B 48 is also used to generate a plurality of control signals to a data entry circuit 54 on lines 56.

The data bus 44 is connected to transfer data to and from the microprocessor through a bi-directional buffer 58. The buffer 58 is connected to a plurality of data bus lines 60 corresponding to the number of lines on the data bus 44. The data lines 60 are connected to receive data from the data entry circuit 54 and are also connected to receive input data from the sample/hold circuits 22. The input data received from the sample/hold circuits 22 and the data entry circuit 54 is received by the microprocessor 32 via the data bus 44. The buffer can be a DP8304B bi-directional transceiver manufactured by National Semiconductor Corporation.

The data entry circuit 54 can be used by the operator to provide selected information to the microprocessor 32. For example, the operator can use the data entry circuit 54 to instruct the microprocessor 32 to perform selected tests on the system to verify that the system is operating properly.

The data bus 44 is also connected to transmit data and control signals to a group of three status latches, latch A 62, latch B 64, and latch C 66. Although not shown in FIG. 1, the latches 62, 64 and 66 can be connected to receive enable signals on lines 67 from the control signal decoder 46. The latches can be model MC14508BCP dual four bit latches manufactured by Motorola Incorporated. The status latch A 68 is used to transmit output data on lines 68 to the indicator circuits 26 for controlling the status of the indicator lights. The number of output data lines 68 typically corresponds to the number of lines on the data bus 44, and this number in turn determines the number of individual indicator circuits which can receive output data simultaneously. If additional indicator circuits are desired, the status latch B 64 is used to generate a plurality if OUTPUT BOARD SELECT signals on lines 70 for selecting which group of indicator circuits are to receive the current set of output data.

The status latch C 66 is used to generate a number of individual control signals. The latch C 66 generates an EMPTY/FULL signal on a line 72, a FLASH SELECT signal on a line 74, and a BAD signal on a line 76. As will be discussed, these signals are used to control the output data which is supplied to the indicator circuits. The latch C 66 also generates a TEST signal on a line 78 as an enable signal to a flash oscillator gate 80I. The oscillator 80 can be a conventional oscillator which generates a FLASH signal on a line 82. As will be discussed, the FLASH signal is supplied to the indicator circuits 26 where it is used to enable selected indicator lights in the flashing mode.

The status latch C also generates an ALARM signal on a line 84 to an alarm circuit 86. The alarm circuit 86 includes means for audibly alerting the operator that a hopper has reached a full condition. Although not shown in FIG. 1, the alarm circuit can include a switch for resetting the alarm once the operator has acknowledged the alarm condition.

Two other control signals are generated by the status latch C 66, a high voltage (H.V.) KILLER signal on the line 88, and an AMP IN signal on a line 90. As will be discussed, both of these signals are utilized when the system is conducting a self-test of the input circuitry. The H.V. KILLER signal is supplied to a high voltage power supply 92 which, under normal operating conditions, generates a high voltage signal on a line 94 to the sample/hold circuits 22. This high voltage signal is utilized to power the radiation sensors. The H.V. KILLER signal is used to disable the high voltage supply when the system is conducting a self-test of the radiation sensors. The AMP IN signal on the line 90 is used to provide test signals to the sample/hold circuits to simulate radiation pulses.

Figure 3:
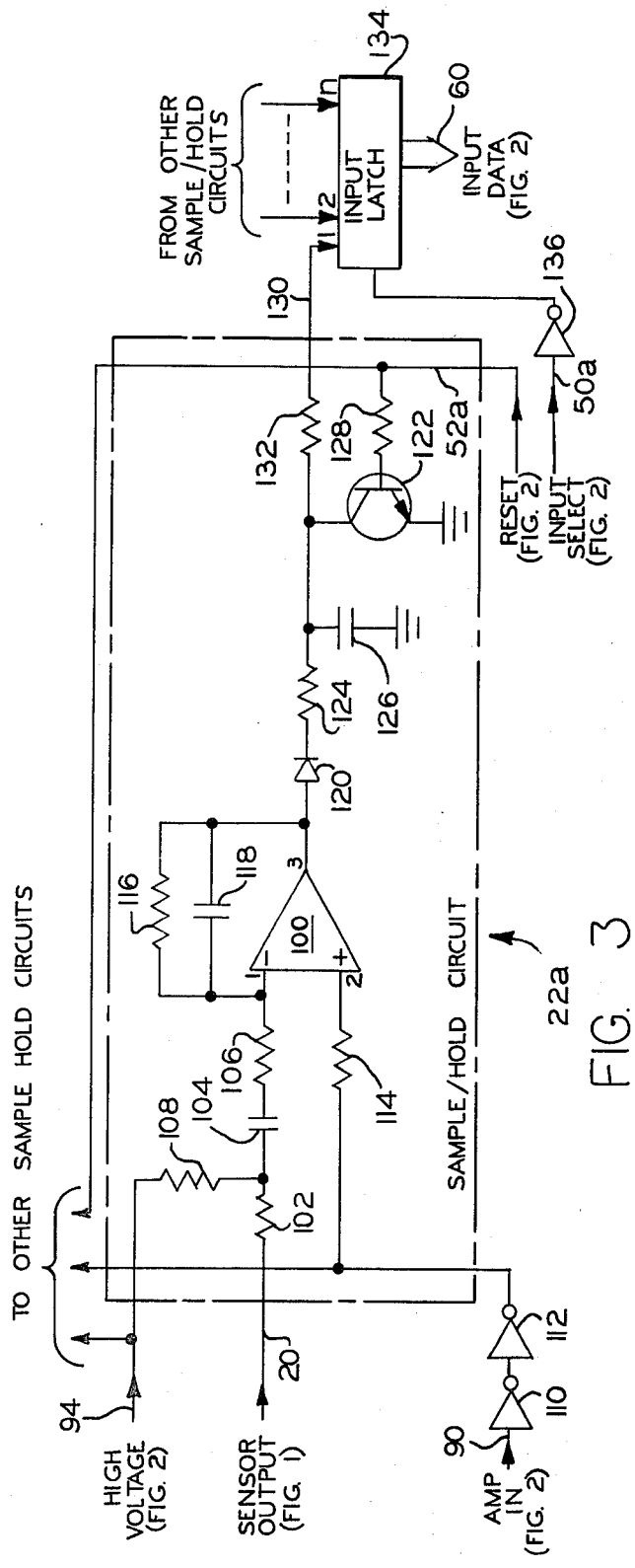
FIG. 3 is a block diagram of one of the sample/hold circuits of FIG. 1 with associated interface circuitry.

There is shown in FIG. 3 an individual sample/hold circuit 22a, along with associated interface circuitry used to connect the circuit 22a to the central control circuit 24. The sample/hold circuit 22a functions to record a pulse generated by the associated radiation sensor 18 on the line 20 until such time as the microprocessor checks for the occurance of a pulse.

The sensor output line 20 is connected to an inverting input 100-1 of an operational amplifier 100 through a serially connected resistor 102, capacitor 104, and resistor 106. The high voltage signal on the line 94 is supplied to the radiation sensor 18 on the line 20 through a resistor 108 connected in series with the resistor 102. A non-inverting input 100-2 is connected to receive the AMP IN signal on the line 90 through a pair of inverters 110 and 112 and a resistor 114 connected in series. The HIGH VOLTAGE signal and the AMP IN signal are also supplied to the other sample/hold circuits (not shown).

A feedback path includes a resistor 116 and a capacitor 118 connected in parallel between the inverting input 100-1 and an output 100-3. The output 100-3 is connected to an anode of a diode 120 having a cathode connected to a collector of an NPN transistor 122 through a resistor 124. A storage capacitor 126 is connected between the collector of the transistor 122 and the circuit ground potential. The transistor 122 has a base connected to receive a RESET signal on a line 52a (one of the lines 52) through a resistor 128 and an emitter connected to the circuit ground potential. The RESET signal on the line 52a is also supplied to the other sample/hold circuits.

The output of the sample/hold circuit 22a is generated on a line 130 connected to the collector of the transistor 122 through a resistor 132. The line 130 is connected to an input 134-1 of an input latch 134. The latch 134 can be a model MC14508BCP manufactured by Motorola Incorporated which includes other inputs 134-2 through 134-n connected to receive the output lines of other sample/hold circuits. The latch 134 is connected to receive an INPUT SELECT signal on a line 50a (one of the lines 50 of FIG. 2) through an inverter 136.

The output lines of the latch 134 are connected to the data lines 60 for transmitting the data to the microprocessor data bus 44 through the buffer 58. Typically, the number of sample/hold circuits which can be accommodated by the input latch 134 corresponds to the number of lines on the microprocessor data bus 44. Additional sample/hold circuits can be added to the system 10 by providing additional input latches which are each controlled by a separate one of the input select lines 50 of FIG. 2. Also, a separate one of the reset signal lines 52 would be used for each group of sample/hold circuits having a common input latch. Thus, the total number of hoppers which could be monitored is equal to the number of lines 44 times the number of input select lines 50.

As previously mentioned, the sample/hold circuit 22a functions to temporarily store the occurance of a radiation incident pulse generated on the line 20. Under normal operating conditions, the circuit 22a receives an AMP IN signal on the line 90 at a magnitude near ground potential. This ground potential signal is then applied through the resistor 114 to the non-inverting input 100-2. When there is no radiation incident pulse present on the line 20, the feedback resistor 116 will maintain the output 100-3 of the amplifier 100 near ground potential. When a radiation incident pulse occurs, the radiation sensor 18 will generate a negative going high voltage pulse on the line 20. Since the value of the resistor 102 is typically much larger than the value of the resistor 108, the magnitude of the negative going pulse on the line 20 is reduced before it is supplied to the inverting input 100-1 of the amplifier 100. The amplifier 100 amplifies and inverts the pulse to generate a positive pulse at the output 100-3. This positive pulse is supplied through the diode 120 and the resistor 124 to charge the capacitor 126. At this time, the transistor 122 is off and the latch input 134-1 is in a high impedance state. When the amplifier output 100-3 returns to ground potential, the diode 120 is reverse biased, and the capacitor 126 retains the charge. The stored charge on the capacitor 126 indicates that the circuit 22a has received a radiation pulse on the line 20.

The central control circuit 24 will then read the sample/hold circuit 22a to check if a radiation pulse has been received. It should be noted that typically the rate at which the sample/hold circuits are checked is greater than the maximum pulse rate of the radiation sensor. As previously mentioned, the central control circuit 24 can read a group of sample/hold circuits simultaneously. For example, all the sample/hold circuits connected to the input latch 134 are read when an INPUT SELECT signal is generated on the line 50a to enable the latch 134. When the latch 134 is enabled, the state of the input lines appears on the respective output lines 60. Thus, if a charge is present on the capacitor 126, the charge will be transmitted to the respective output line of the latch 134 to signal the central control circuit that a radiation pulse has been received by the circuit 22a. When the latch 134 is not enabled, the output will be at a high impedance state to prevent interference with the transmission of other data on the lines 60.

After the central control circuit 24 has read the sample/hold circuits connected to the latch 134, the circuit 24 will generate a RESET signal on the line 52a to momentarily turn on the transistor 122. This causes the capacitor 126 to discharge to ground potential through the transistor 122. The capacitor 126 is now ready to be charged upon the occurance of another radiation pulse.

Figure 4:
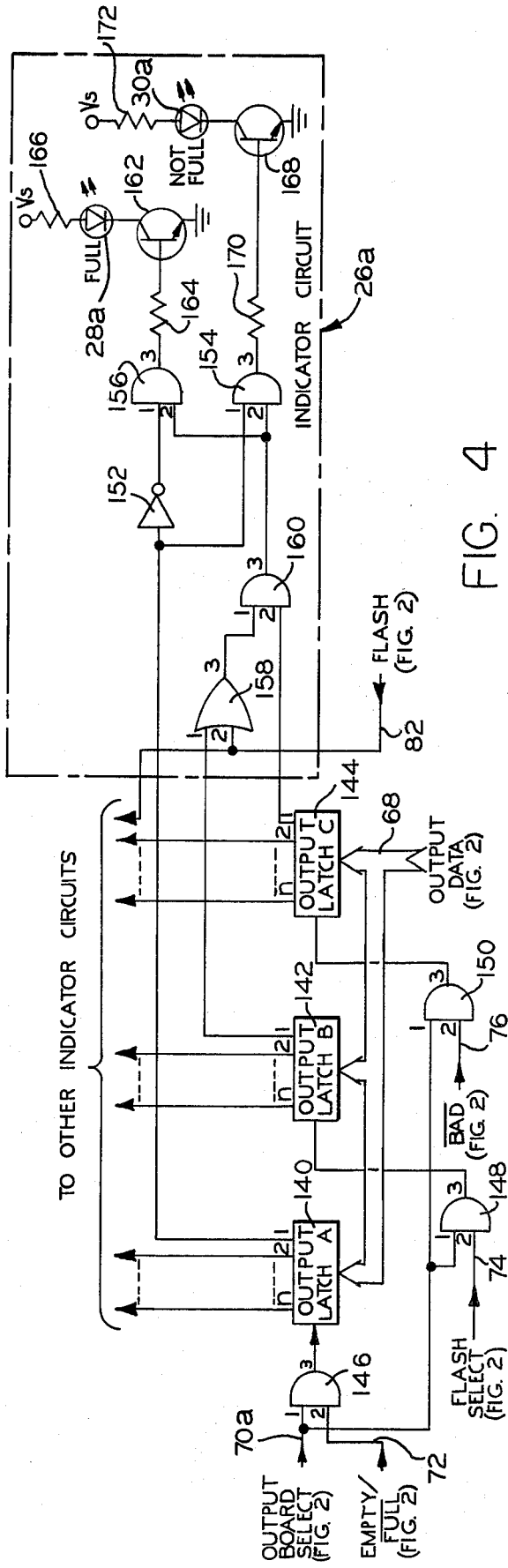
FIG. 4 is a block diagram of one of the indicator circuits of FIG. 1 with associated interface circuitry.

There is shown in FIG. 4 an indicator circuit 26a and an associated interface circuit used to connect the plurality of indicator circuits 26 to the central control circuit 24. The interface circuitry includes a group of three latches, 140, 142, and 144 which can be model MC14508BCP manufactured by Motorola Incorporated. Each of the three latches has inputs connected to receive output data from the microprocessor 32 through the status latch A 62 on the lines 68.

A group of three AND gates 146, 148, and 150 have outputs 146-3, 148-3, and 150-3 connected to enable inputs of the latches 140, 142, and 144 respectively. A logic "1" generated at the enable input of one of the latches causes the data on the lines 68 to be latched at the respective output lines. Each of the output latches has a predetermined number of individual output lines corresponding to the number of individual lines 68. For example, latch A 140 includes output lines 140-1, and 140-2 through 140-n, where n equals the number of individual lines 68. Similarly, latches 142 and 144 include output lines 142-1 through 142-n and 144-1 through 144-n respectively.

The AND gates 146, 148, and 150 have inputs 146-1, 148-1, and 150-1 respectively connected to receive an OUTPUT BOARD SELECT signal on a line 70a (one of the lines 70 of FIG. 2). The signal on the line 70a will be at logic "1" when it is desired to transfer output data on the line 68 through one of the latches 140, 142 or 144. The other OUTPUT BOARD SELECT signals on the lines 70 can be utilized to select additional output latches (not shown) which can be connected to additional indicator circuits (not shown).

The second input to each of the AND gates 146, 148, and 150 selects which one of the output latches is to be enabled. An input 146-2 is connected to receive the EMPTY/$\overline{FULL}$ signal on the line 72. When both inputs to the AND 146 are at logic "1", the data on the lines 68 is latched at the outputs of the latch 140. As will be discussed, the data supplied through the latch 140 selects whether an indicator circuit enables the "not full" light or the "full" light. An input 148-2 is connected to receive the FLASH SELECT signal on the line 74. When both inputs to the AND 148 are at logic "1", the data on the lines 68 is latched at the outputs of the latch 142. As will be discussed, outputs of the latch 142 select whether or not an indicator circuit is to be set to a flashing condition. An AND input 150-2 is connected to the line 76 to receive the $\overline{BAD}$ signal. The $\overline{BAD}$ signal is generated at logic "1" when it is desired to transfer data on the lines 68 to the outputs of the latch 144. The outputs of the latch 144 control which indicator circuits are to have both indicator lights turned off to indicate a malfunction in that particular channel.

A single output line from each of the latches 140, 142, and 144 is applied to each indicator circuit. In FIG. 4, the output lines 140-1, 142-1, and 144-1 are connected to the indicator circuit 26a. The remaining output lines from the latches 140, 142, and 144 are supplied to other indicator circuits which are similar to the indicator circuit 26a.

The output line 140-1 is connected to an input of an inverter 152 and an input 154-1 of an AND gate 154. An output of the inverter 152 is connected to an input 156-1 of an AND gate 156. The output line 142-1 is connected to an input 158-1 of an OR gate 158. A second input 158-2 of the OR gate 158 is connected to receive the FLASH signal on the line 82 from the flash oscillator 80. An OR gate output 158-3 is connected to an input 160-1 of an AND gate 160. The output line 144-1 is connected to an AND gate input 160-2. An output 160-3 of the AND gate 160 is connected to AND gate inputs 154-2 and 156-2.

An output 156-3 of the AND gate 156 is connected to a base of an NPN transistor 162 through a resistor 164. A light emitting diode (LED) 28a has a cathode connected to a collector of the transistor 162 and an anode connected to a Vs power supply (not shown) through a resistor 166. An emitter of the transistor 162 is connected to the circuit ground potential.

An output 154-3 of the AND gate 154 is connected to a base of an NPN transistor 168 through a resistor 170. An LED 30a has a cathode connected to a collector of the transistor 168 and an anode connected to the Vs power supply through a resistor 172. An emitter of the transistor 168 is connected to ground potential.

The LED 28a is one of the "FULL" indicator lights 28 shown in FIG. 1, while the LED 30a is one of the "NOT FULL" lights 30. The status of the LEDs 28a and 30a is controlled by the logic levels generated at latch outputs 140-1, 142-1, and 144-1.

When the hopper associated with the indicator circuit 26a is not full, the latch output 140-1 generates a logic "1" to the inverter 152 and the AND input 154-1. Normally, the AND gate 160 generates a logic "1" to the AND gate inputs 154-2 and 156-2. Thus, both inputs to the AND gate 154 are at "1" such that a logic "1" is generated at the output 154-3. This causes the transistor 168 to turn on and pull the cathode of the LED 30a to near ground potential. The LED 30a will then light to indicate a not full condition.

The LED 30a will remain lit until the logic level of the output 140-1 changes to logic "0", indicating a full condition. This causes the AND gate 154-3 to change logic states to "0", to turn off the transistor 168 and the LED 30a. However, both inputs to the AND gate 156 will now be at "1" such that a logic "1" will be generated at the output 156-3. This causes the transistor 162 to turn on and light the "FULL" LED 28a.

In some instances, as will be discussed, it is desirous to flash one of the LEDs. In these instances, a logic "0" is generated at the latch output 142-1 to the OR gate input 158-1. The oscillator 80, which runs continuously is also supplied to the OR gate input 158-2. Since the input 158-1 is at logic "0", the OR gate output 158-3 alternates between logic "0" and "1" in accordance with the oscillating input signal. Since the AND gate input 160-2 is normally at logic "1", the output 160-3 will alternate between logic "0" and logic "1" with the input 160-1.

This alternating signal is then supplied to the AND gate inputs 154-2 and 156-2. This causes the AND gate having its other input at logic "1" to generate an alternating output signal which turns the associated transistor on and off. This results in a flashing LED which remains flashing until the logic signal at the output 142-1 returns to logic "1".

When the microprocessor has detected a malfunction in the input circuitry for a particular hopper, it will alert the operator of this condition by enabling the alarm circuit 86 (FIG. 2) and by turning off both the "FULL" LED 28a and the "NOT FULL" LED 30a. This condition is achieved by generating a logic "0" at the latch output 144-1. When this output is at logic "0", the AND output 160-3 will also be at logic "0". Since both ANDs 154 and 156 will receive a logic "0" input, both outputs 154-3 and 156-3 will be at logic "0". Thus, both transistors 162 and 168 will be turned off along with the associated LEDs.

OPERATION

Figure 5:
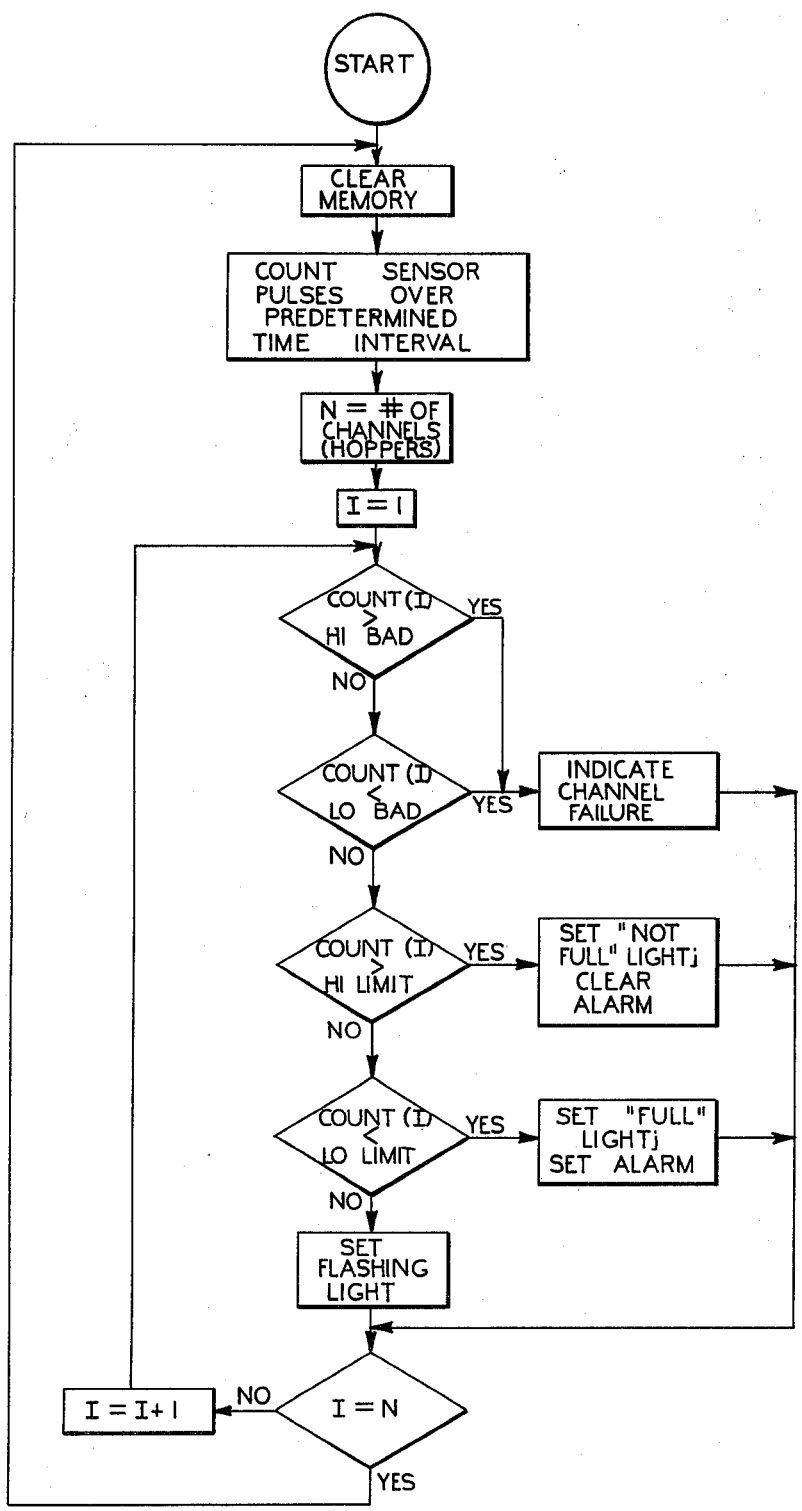
FIG. 5 is a simplified flow diagram illustrating the general operation of the indicator circuits of FIGS. 1 and 4.

The general operation of the multi-point level indicator system 10 is illustrated in the simplified flow diagram of FIG. 5. Before discussing the flow diagram of FIG. 5, it should be noted that, after a predetermined time interval, the count total of each channel is compared with four separate predetermined levels, a HI BAD level, a LO BAD level, a HI LIMIT level and a LO LIMIT level. The HI BAD level is selected to represent a count level higher than would normally be expected over the predetermined period for a completely empty hopper. Thus, if a particular count is greater than the HI BAD level, this is a good indication that the respective radiation sensor is malfunctioning and generating spurious pulses. On the other hand, the LO BAD level is selected to represent a level lower than would be expected over the predetermined time period for a completely full hopper. If a particular count is less than the LO BAD level, this is a good indication that the system is not recording all the pulses generated by the radiation sensor. Thus, either the sensor may be malfunctioning or there may be a break in the cable between the sensor and the respective sample/hold circuit.

The HI LIMIT level is set to represent a level which would normally be expected for a "not full" hopper, while the LO LIMIT level is set to represent a level which would normally be expected for a "full" hopper. If the count falls between the HI LIMIT and the LO LIMIT, this is a good indication that, either the hopper is approaching a full condition or, if the hopper has just recently been emptied, that there is a build-up of fill material on the side walls of the hopper. As will be discussed, the system alerts the operator that a particular count is between the HI LIMIT and the LO LIMIT by setting the respective indicator light to a flashing mode.

Referring now to FIG. 5, the program initiates at a circle "START". The program then enters a processing function "CLEAR MEMORY" which includes instructions for clearing all the memory locations used to store the total number of detection pulses generated by each sensor over the last predetermined time interval. The program then enters a processing function "COUNT SENSOR PULSES OVER PREDETERMINED TIME INTERVAL" which includes instructions for reading each sample/hold circuit to check whether the respective sensor has generated a detection pulse since the last reading. As previously mentioned, the number of sample/hold circuits which can be read simultaneously is limited to the number of individual data lines in the data bus 44. The particular group of sample/hold circuits to be read is selected by one of the input select lines 50. After each group of sample/hold circuits is read, the microprocessor generates a RESET signal on one of the reset lines 52 to clear the group of sample/hold circuits. The group of sample/hold circuits are then ready to receive another detection pulse. It should be noted that the sampling rate for reading the sample/hold circuits is greater than the rate at which pulses are generated by the radiation sensor to ensure that each pulse will be counted by the microprocessor. Generally, the speed of operation of a typical microprocessor is much greater than the pulse generation rate of a radiation sensor.

Each time the data received by the microprocessor from the sample/hold circuits indicates that a particular channel has generated a detection pulse, the microprocessor will increment the "COUNT" in the respective memory location by one. The above described counting process will continue for a predetermined time interval. At the end of this time interval, the program enters a processing function "N=NUMBER OF CHANNELS" wherein the variable N is set equal to the number of hoppers which are being monitored. Next, the program enters a processing function "I=1" for setting the variable I equal to one. The variable I represents the particular hopper whose "COUNT" is to be analyzed. The program then enters a decision point "COUNT (I)>HI BAD" wherein the count associated with the channel I is compared with the HI BAD level. If the COUNT (I) value is greater the HI BAD value, there is a high degree of probability that there is a malfunction in the radiation sensor. The program then exits the decision point at "YES" and enters a processing function "INDICATE CHANNEL FAILURE" which includes instructions for alerting the operator of the channel failure. This can be accomplished by enabling the alarm circuit 86 and by turning off both the "FULL" and "NOT FULL" indicator lights associated with the particular channel. If the COUNT (I) value is not greater than the HI BAD level, the program then exits the decision point "COUNT (I)>HI BAD" at "NO" and enters a decision point "COUNT (I)<LO BAD" to compare the COUNT (I) with the LO BAD value. If the COUNT (I) is less than the LO BAD value, there is probably a defect in the associated radiation sensor, or a break in the cable and the program exits at "YES" and enters the processing function "INDICATE CHANNEL FAILURE".

It should be noted at this time that, by incorporating the decision points which compare the COUNT (I) with the HI BAD and LO BAD values into the normal operation of system, the system is continuously performing a "self-test" on the radiation sensors to check for proper operation and connection of the sensors. As will be discussed, the system can perform other "self-tests" to check for proper operation of the associated input circuitry.

If the COUNT (I) value is greater than the LO BAD value, the program exits the decision point "COUNT (I)<LO BAD" at "NO" and enters a decision point "COUNT (I)>HI LIMIT" to compare the COUNT (I) value with the HI LIMIT value. If the count is greater than the HI LIMIT value, the hopper has not reached a full condition, and the program branches at "YES" and enters the processing function 'SET "NOT FULL" LIGHT: CLEAR ALARM'. This processing function includes instructions for turning on the "NOT FULL" indicator light and for clearing the alarm.

If the COUNT (I) value is less than the HI LIMIT value, the program exits the decision point "COUNT (I)>HI LIMIT" at "NO" and enters a decision point "COUNT (I)<LO LIMIT". If the COUNT (I) is less than the LO LIMIT value, the hopper is full, and the program branches at "YES" to a processing function 'SET "FULL" LIGHT; SET ALARM'. The central control circuit will then turn on the associated "FULL" indicator light along with the alarm circuit to bring the full hopper to the attention of the operator.

At this time, if the COUNT (I) is greater than the LO LIMIT value, the COUNT (I) falls between the HI LIMIT value and the LO LIMIT value. When the COUNT (I) is between these two values, this is a good indication that, either the hopper is approaching a full condition or, if the hopper has recently been emptied, that there a build-up of fill material on the side walls of the hopper. In either case, the present system will alert the operator that the COUNT (I) falls between the LO LIMIT and the HI LIMIT. The program exits the decision point "COUNT (I)<LO LIMIT" at "NO" and enters a processing function "SET FLASHING LIGHT". The microprocessor 32 will then generate the control signals required to flash one of the indicator lights associated with that particular hopper. Typically, the particular indicator light which is set to the flashing mode is the light which was in the on state after the last count check. This method of flashing one of the channel indicator lights when the count is between the LO LIMIT and HI LIMIT can be of great assistance to the operator. For example, if the hopper has not been emptied for some time, and one of the indicator lights begins flashing, the operator is alerted that he may soon have to empty the hopper. On the other hand, if the hopper has just been emptied and is not expected to be full for some time, and one of the indicator lights is in the flashing mode, the operator is alerted that there may be a build-up of fill material on the side wall of the hopper. The operator can then visually check the particular hopper to see if it needs clearing. It should be noted that an operator is also alerted to a wall build-up condition if the "FULL" indicator light remains on after the hopper has been emptied.

After either indicating a channel failure, setting one of the indicator lights, or going to the flashing mode, the program enters a decision point "I=N" to check if all the COUNT values have been tested. If not all of them have been tested, the program exits the decision point at "NO" and enters the processing function "I=I+1" to increment the value I by one. The program then returns to the decision point "COUNT (I)>HI BAD" to test the new count. If all the count values have been tested, the program exits the decision point "I=N" at "YES" and returns to the processing function "CLEAR MEMORY" to clear the count memory.

As previously mentioned, the multi-point level indicator system 10 has the ability to self-test the input circuitry associated with counting the radiation detection pulses. The system automatically performs this self-test on a periodic basis, for example, every ten seconds. In conducting a self-test of the input circuitry, the microprocessor will first disable the high voltage power supply 92 by generating an H.V. KILLER signal on the line 88. This removes the high voltage signal on the line 94 to disable the radiation sensors 18. At this time, no radiation pulses can be generated by the sensors 18.

Next, the microprocessor 32 clears the memory locations used for storing the radiation count totals. After the memory has been cleared, the microprocessor will simulate a series of radiation pulses by generating an AMP IN signal on the line 90 to the sample/hold circuits 22. The AMP IN signal consists of a predetermined number of pulses. After each AMP IN pulse is generated, the microprocessor will read the sample/hold circuits and, if the pulse has been stored, the associated memory locations will be incremented by one. When all the AMP IN pulses have been generated, the microprocessor will provide a quiet period during which no input pulses are generated. At the end of this quiet period, the count totals stored in the memory locations are compared with the predetermined number representing the number of AMP IN pulses generated. If the input circuitry is operating properly, the stored count should equal the predetermined count. If they are different, there may be a malfunction in the input circuitry. For example, a count total less than the predetermined count may indicate that pulses are not getting through the input circuitry. On the other hand, a count total higher than the predetermined count may indicate that there is a problem with spurious noise. Thus, the input circuitry utilized to count the input pulses has been checked.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An apparatus for monitoring the level of material in each one of a plurality of hoppers having a plurality of sensor means, each of the sensor means individual to one of the hoppers for generating a plurality of sensor output signals representing the amount of the material at an associated level in the associated hopper, comprising: central control means for selectively reading the rate of occurrence of the output signals of each of the sensors and for generating a status signal for each of the sensors when the rate of occurrence of the output signals corresponds to a first predetermined amount of the material in the associated hopper; and a plurality of indicator means, each of said indicator means individual to one of the hoppers and responsive to an associated condition of said status signals for indicating that the amount of the material in the associated hopper is at said first predetermined amount.

2. The apparatus according to claim 1 wherein each level sensor means includes a radiation source positioned on one side of the associated hopper and a radiation sensor positioned on an opposite side of the associated hopper, said radiation sensors being responsive to the incidence of radiation from the associated one of said radiation sources for generating said sensor output signals.

3. The apparatus according to claim 2 wherein said means for selectively reading reads the sensor output signals at a predetermined rate greater than the normal rate of incidence of radiation at said radiation sensors when the associated hopper is empty of the material.

4. The apparatus according to claim 3 including means connected to said central control means for storing said sensor output signals and wherein said means for reading reads the sensor output signals cyclically and clears said means for storing after reading said sensor output signals during each reading cycle.

5. The apparatus according to claim 2 wherein said means for reading includes means for reading the sensor output signals over a predetermined time interval and generating a total sensor output signal for each of said radiation sensors representing the number of said sensor output signals read during said predetermined time interval; and means responsive to said total sensor output signals for generating said status signals.

6. The apparatus according to claim 1 wherein said means for reading includes means responsive to one of the sensor output signals representing an amount of the material below said first predetermined amount for generating a first status signal and said indicating means is responsive to said first status signal for generating a "NOT FULL" indication for the associated hopper.

7. The apparatus according to claim 6 wherein said means for generating a first status signal is responsive to one of the sensor output signals representing an amount of the material above a second predetermined amount greater than said first predetermined amount for generating a second status signal and said indicating means is responsive to said second status signal for generating a "FULL" indication for the associated hopper.

8. An apparatus for monitoring the level of the material in each of first and second hoppers including first and second sensor means for generating first and second pluralities of output signals respectively representing the amounts of the material in the first and second hoppers at associated levels respectively, comprising: means for periodically reading the output signals of each of the sensors over a predetermined time interval to generate first and second total sensor output signals representing the sums of the respective pluralities of first and second output signals read; means responsive to said first and second total sensor output signals for generating first and second status signals when the material in the first and second hoppers respectively is a predetermined amount at the associated level; and first and second indicating means responsive to said first and second status signals respectively for indicating that the material amounts in the first and second hoppers respectively are at said predetermined amounts respectively.

9. The apparatus according to claim 8 wherein each of the first and second sensor means includes a radiation source positioned on one side of the associated hopper and a radiation sensor positioned on the opposite side of the hopper, said radiation sensors generating said sensor output signals upon receiving radiation from said radiation sources.

10. The apparatus according to claim 9 including means connected to said periodic reading means for storing said sensor output signals and wherein said means for periodically reading clears said means for storing after reading said sensor output signals during each cycle.

11. The apparatus according to claim 10 wherein said means for reading is responsive to said sensor output signals for generating said first and second total sensor output signals with values representing the total number of sensor output signals read during said predetermined time interval.

12. The apparatus according to claim 8 wherein said means for generating said first and second status signals generates said first and second status signals in response to said first and second total sensor output signals respectively representing amounts of the material below said first predetermined amount and said first and second indicating means are responsive to said first and second status signals for generating a "NOT FULL" indication for the first and second hoppers respectively.

13. The apparatus according to claim 12 wherein said means for generating said first and second status signals generates third and fourth status signals in response to said first and second sensor output signals respectively representing amounts of the material above a second total predetermined amount greater than said first predetermined amount and said first and second indicating means are responsive to said third and fourth status signals respectively for generating a "FULL" indication for the first and second hoppers respectively.

14. An apparatus for monitoring the level of material in each one of a plurality of hoppers, comprising: a plurality of sensor means each including a radiation source positioned on one side of an associated hopper and a radiation sensor positioned on an opposite side of said associated hopper, said radiation sensors being responsive to the incidence of radiation for generating pluralities of sensor output signals; central control means for periodically reading the output signals of each of said sensors for providing a summed signal corresponding to the rate of occurrence of said pluralities of output signals and for generating a status signal for each of said sensors when the amount of the material at an associated level in the associated hopper is a predetermined amount; and a plurality of indicator means each individual to one of the hoppers and responsive to an associated one of said status signals for indicating that the material in the associated hopper is at said predetermined amount.

* * * * *